(12) United States Patent
Dorai et al.

(10) Patent No.: US 7,668,371 B2
(45) Date of Patent: Feb. 23, 2010

(54) SYSTEM AND METHOD FOR ADAPTIVELY SEPARATING FOREGROUND FROM ARBITRARY BACKGROUND IN PRESENTATIONS

(75) Inventors: Chitra Dorai, Chappaqua, NY (US); Ying Li, Yorktown Heights, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/126,262

(22) Filed: May 23, 2008

(65) Prior Publication Data

US 2008/0219554 A1 Sep. 11, 2008

Related U.S. Application Data

(63) Continuation of application No. 11/034,583, filed on Jan. 13, 2005.

(51) Int. Cl.
*G06K 9/34* (2006.01)
(52) U.S. Cl. .................. 382/173; 382/103; 348/169

(58) Field of Classification Search ............... 382/103, 382/173; 348/169
See application file for complete search history.

(56) References Cited

U.S. PATENT DOCUMENTS 6,999,600 B2 * 2/2006 Venetianer et al. .......... 382/103
2004/0086152 A1 * 5/2004 Kakarala et al. ............ 382/103

* cited by examiner

*Primary Examiner*—Vikkram Bali
*Assistant Examiner*—Eueng-Nan Yeh
(74) *Attorney, Agent, or Firm*—Yee & Associates, P.C.; Preston J. Young

(57) ABSTRACT

System and method for distinguishing between foreground content and background content in an image presentation. An initial background model is provided, and a final background model is constructed from the initial background model using the image presentation. The foreground content and background content in the image presentation are then distinguished from one another using the final background model. The present invention permits foreground content and background content to be separated from one another for further processing in different types of computer-generated image presentations such as digital slide presentations, video presentations, Web page presentations, and the like.

13 Claims, 2 Drawing Sheets

SYSTEM AND METHOD FOR ADAPTIVELY SEPARATING FOREGROUND FROM ARBITRARY BACKGROUND IN PRESENTATIONS

This application is a continuation of application Ser. No. 11/034,583 filed Jan. 13, 2005, status pending.

BACKGROUND OF THE INVENTION

1. Technical Field

The present invention relates generally to the field of multimedia content analysis and, more particularly, to a system and method for distinguishing between foreground content and background content in an image presentation.

2. Description of Related Art

Figure-ground separation relates to the capability of distinguishing between foreground material and background material in an image, and is a fundamental problem in image processing applications. For example, consider an image that contains a boy playing with a ball on a beach. If the objective is to identify the boy, the boy with the ball is the foreground and the beach is the background. If, however, the objective is to identify the beach or waves breaking on the beach, the beach becomes the foreground and everything else in the image becomes background.

The human visual system is able to effortlessly separate foreground content from background content in a viewed image by combining various clues to decipher the foreground based on current interest. An image processing system also faces the task of figure-ground separation because further image recognition procedures can proceed effectively only if the foreground content of an image is first well separated from background content. Most image processing systems use externally determined policies to drive a figure-ground separation module, such that the system knows ahead of time what the foreground of an image is expected to be. If the foreground is not known in advance, however, problems may occur in correctly separating foreground content from background content in different types of image presentations.

When communicating to an audience, for example, when giving a speech or teaching a course to a group of students; it is a common practice to write or otherwise provide information on a transparency, such as a slide or a foil, and to project the information onto a screen using a projector so that the information may be easily viewed by the audience. Recently, computer-generated presentation has become a popular and professional way to provide visual materials to an audience. With computer-generated presentation, a computer is directly connected to a digital projector, thus avoiding the need for physical media such as slides or foils. As used in the present application, a presentation is any document that may contain one or more types of media data such as text material, images and graphics. Some examples of computer-generated presentation types include digital slide presentations, Web page presentations, Microsoft Word® document presentations, and the like.

A digital slide presentation, for example, is created using computer software such as Microsoft Power Point® or Lotus Freelance Graphics®, rather than being hand-drawn or hand-written as with conventional slides. Digital slides commonly include text-based information, and may also include some figures, tables or animation materials. Inasmuch as Power Point and Lotus Freelance Graphics design templates provide a rich set of choices, the pages in these presentations (i.e., the individual slides) often include a relatively complex background, for example, a background that varies in color or texture, or a background that includes one or more images; rather than a blank background or a background of a single uniform color. A user often selects relatively complex backgrounds for an image presentation to improve the clarity and visual appeal of the presentation and to satisfy aesthetic preferences.

While the diverse backgrounds available using Microsoft Power Point or Lotus Freelance Graphics can be effective in enhancing audience attention, the backgrounds also present a severe challenge to the problem of automatic presentation content analysis. For example, slide text recognition techniques have been effectively used to extract text from a slide so that the text can be used to index and annotate slide content for archival and search purposes. A complex slide background, however, affects the text recognition accuracy to a certain extent because separation of foreground text embedded in a complex background becomes very difficult with automated techniques. This is because most existing text separation techniques make initial assumptions about the kinds of background that can be present in the pages, in order to control pixel variations that must be handled.

It would, accordingly, be advantageous to provide a system and method for distinguishing between foreground content and background content in an image presentation, such as a computer-generated image presentation, that is effective with diverse types of backgrounds including relatively complex backgrounds such as backgrounds that vary in color or texture or that include one or more images.

SUMMARY OF THE INVENTION

The present invention provides a system and method for distinguishing between foreground content and background content in an image presentation. An initial background model is provided, and a final background model is constructed from the initial background model using the image presentation. The foreground content and background content in the image presentation are then distinguished from one another using the final background model. The present invention is effective in distinguishing between foreground content and background content in computer-generated image presentations having diverse types of backgrounds including relatively complex backgrounds such as backgrounds that vary in color or texture or that include one or more images.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
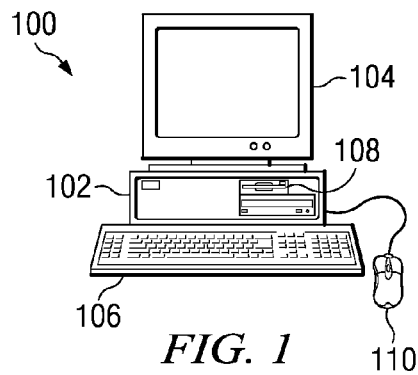
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
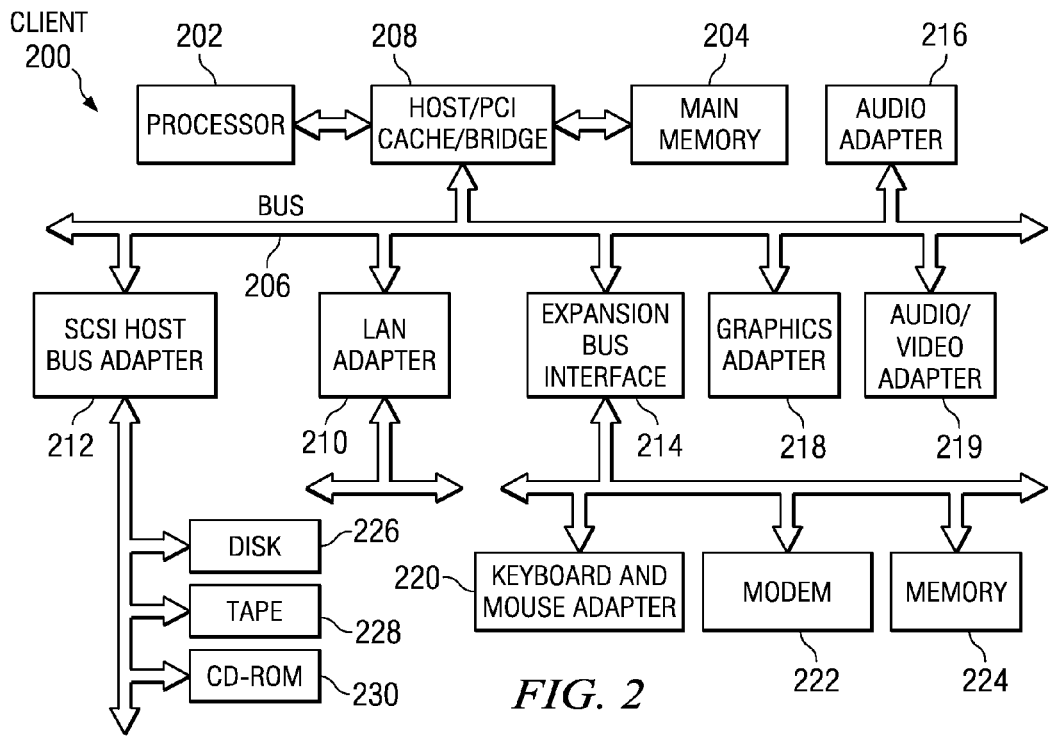
FIG. 2 is a block diagram of a data processing system in which the present invention may be implemented in accordance with a preferred embodiment of the present invention.

With reference now to FIG. 2, a block diagram of a data processing system is shown in which the present invention may be implemented in accordance with a preferred embodiment of the present invention. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
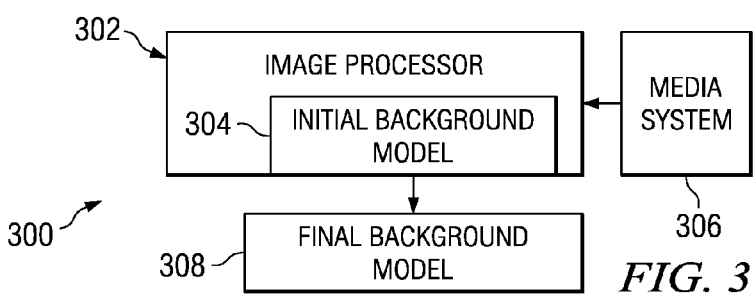
FIG. 3 is a block diagram of an image processing system for constructing a background model of an image presentation in accordance with a preferred embodiment of the present invention.

FIG. 3 is a block diagram of an image processing system for constructing a background model of an image presentation in accordance with a preferred embodiment of the present invention. The image processing system is generally designated by reference number 300, and includes an image processor 302 that may, for example, be implemented as processor 202 in data processing system 200 illustrated in FIG. 2. Image processing system 300 also includes an initial universal background model (BGM) 304 that has been input to or otherwise provided in image processor 302. Initial BGM 304 is a model of an image presentation background and is typically independent of any particular image presentation. Initial BGM 304 may, for example, be a model of a background of a particular color, a blank or empty background, or another more complex background.

A media stream 306 comprises an input to image processor 302. Media stream 306 may include one or more image presentation types, for example, a video presentation, a Power Point slide presentation or a Web page presentation, that contain both foreground and background content. As will be explained in detail hereinafter, image processor 302 gradually adapts initial BGM 304 to construct and output a final BGM 308 for each of the one or more image presentation types in media stream 306. Final background models 308 are then used to distinguish between the foreground content and the background content in each of the image presentation types included in media stream 306 for subsequent image processing procedures.

Figure 4:
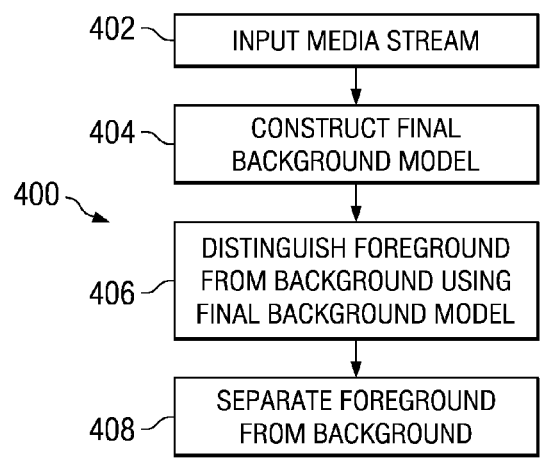
FIG. 4 is a flowchart that illustrates a method for separating foreground content from background content in an image presentation in accordance with a preferred embodiment of the present invention.

FIG. 4 is a flowchart that illustrates a method for separating foreground content from background content in an image presentation in accordance with a preferred embodiment of the present invention. The method is generally designated by reference number 400 and begins by inputting a media stream that contains one or more image presentation types (Step 402). A final background model is constructed for each image presentation type in the input media stream from an initial background model (Step 404), and the final background models are then used to distinguish between foreground content and background content in each image presentation type in the media stream (Step 406). The foreground content of each image presentation type may then be separated from the background content, for example, by subtracting the background content from the image presentation type, for subsequent image processing procedures (Step 408).

Figure 5:
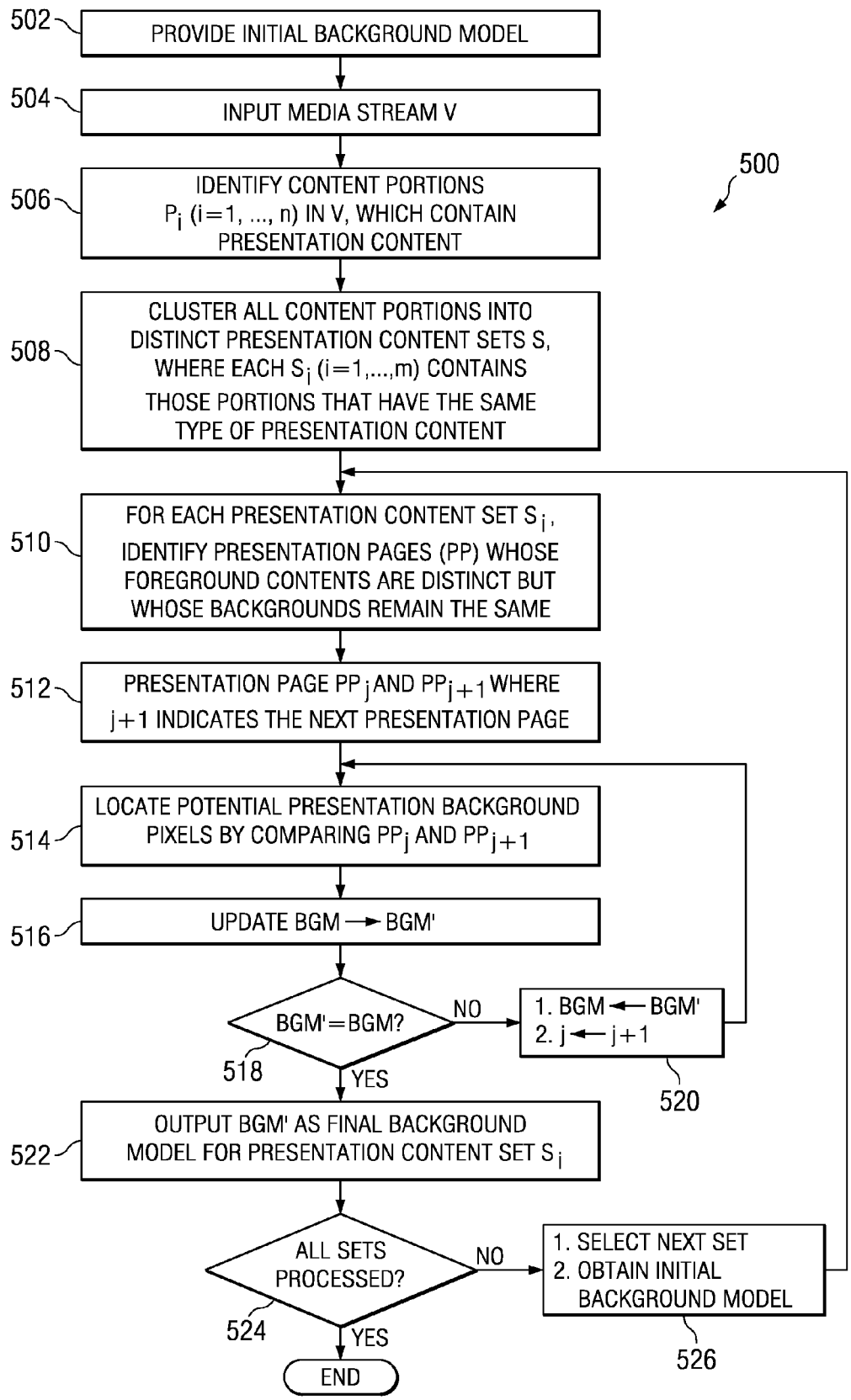
FIG. 5 is a flowchart that illustrates a method for constructing a background model of an image presentation in accordance with a preferred embodiment of the present invention.

FIG. 5 is a flowchart that illustrates a method for constructing a background model of an image presentation in accordance with a preferred embodiment of the present invention. The method is generally designated by reference number 500 and comprises an implementation of Step 404 illustrated in FIG. 4. Method 500 begins by inputting or otherwise providing an initial background model (BGM) in an image processor which is independent of any particular image presentation (Step 502). The initial BGM could be a model of a background of a particular color, of a blank background, or of a more complex background. A media stream V is then input to the image processor (Step 504). Media stream V is of a particular media data type such as a video, a Power Point slides, a Web pages or another data type. At least one portion of media stream V contains a type of presentation content from which a final background model will be constructed using the initial BGM.

The content portions $P_i$ (i=1, 2, ... n) in V, where each content portion $P_i$ contains a type of presentation content are identified (Step 506). For example, content portions $P_1$ and $P_2$ may contain slides, while content portions $P_3$ and $P_4$ may contain Web pages. In this regard, it should be appreciated that $P_i$ and $P_{i+1}$ are not necessarily continuous in the temporal domain. It should also be noted that if media content V is a Webcast containing only presentation material, step 506 can be omitted.

All content portions $P_i$ (i=1, 2, ... n) identified in Step 506 are then clustered into distinct presentation content sets S, where each presentation content set $S_i$ (i=1, 2 ... m) contains those content portions that have the same type of presentation content (Step 508). For example, content portions $P_1$ and $P_2$ could be clustered into presentation content set $S_1$ and content portions $P_3$ and $P_4$ can be clustered into presentation content set $S_2$. The clustering scheme should be sensitive enough to place content portions that vary in background into distinct clusters without having to predetermine which is foreground and which is background.

Then, for each presentation content set $S_i$ (i is initialized to 1), presentation pages PP whose foregrounds are distinct from each other but whose backgrounds remain the same are identified (Step 510). For example, presentation pages could be individual slides in the presentation content set $S_1$ in case of $P_1$ and $P_2$ and individual Web pages in $S_2$ in case of $P_3$ and $P_4$. If necessary, the presentation pages are normalized to be the same size prior to comparing the pages in Step 514.

The result of Step 510 is an identified set of presentation pages $PP_j$ and $PP_{j+1}$ (j is initialized to 1, and j+1 indicates a next presentation page) within presentation content set $S_i$ (Step 512). Potential background pixels in presentation pages $PP_j$ and $PP_{j+1}$ are then located by measuring the sameness and difference of the presentation pages (Step 514). The located potential background pixels are then incorporated into the initial BGM to provide updated BGM' (Step 516).

A determination is then made if BGM' equals BGM (Step 518). If BGM' does not equal BGM (No output of Step 518), this means the background model requires further updating. In this case, BGM' is considered to be BGM and j+1 is considered to be j (Step 520), and Steps 514 through 518 are repeated by considering a next pair of presentation pages. If, on the other hand, BGM' equals BGM (Yes output of Step 518), this means the background model has reached a stable state and no more presentation pages are needed to continue the adaptation process. BGM' is then output as the final background model for presentation content set $S_i$ (Step 522). The number of iterations required to complete this adaptation process varies from application to application, and depends on the content complexity of both presentation foreground and background. However, at least two iterations are needed for a complete adaptation process.

A determination is then made if all presentation content sets have been processed (Step 524). If not, (No output of Step 524), the process continues by selecting the next presentation content set and obtaining the initial BGM (Step 526), and then repeating Steps 510 through 524. If all presentation content sets have been processed (Yes output of Step 524), the method ends. The resulting final BGM for each presentation content set can then be used to distinguish between foreground content and background content in each presentation content set for further image processing as described in connection with FIG. 4.

Depending on the content nature of media stream V, Steps 506 to 510 could be realized by applying various media content analysis and machine learning techniques. Furthermore, in real applications, the particular presentation background model in Step 502 could be selected and constructed in various ways. For instance, in a simple case, the initial background model could be a bitmap where each bit refers to one image pixel indicating whether or not it is a background pixel. In this case, the model update in Step 516 will only involve simple bit value settings. Alternatively, more complex statistical models could be applied including Gaussian mixture model (GMM), hidden Markov model (HMM) and Bayesian network.

The present invention thus provides a system and method for distinguishing between foreground content and background content in an image presentation. An initial background model is provided, and a final background model is constructed from the initial background model using the image presentation. The foreground content and background content in the image presentation are then distinguished from one another using the final background model. The present invention is effective in distinguishing between foreground content and background content in computer-generated image presentations having diverse types of backgrounds including relatively complex backgrounds such as backgrounds that vary in color or texture or that include one or more images.

The present invention can be utilized in numerous image processing applications. For example, by using a final background model constructed for a particular slide presentation in accordance with the present invention, the foreground content of the slides can be easily and cleanly extracted from the slides and can be fed into a slide text recognition scheme for automatic slide content analysis. Also, when the foreground has been separated from the background, different slides can be easily compared against each other without being disturbed by different backgrounds. This can be useful to identify particular slides from a large collection of slides that contain the same text content but that have different backgrounds, and that match a query slide. In a similar manner, the present invention can also be used to identify unauthorized uses/copies of presentations. Slides could also be compared based on their backgrounds (i.e., by subtracting the foreground content from the slides) to determine if the slides are from the same presentation or for other purposes.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method, implementing instructions stored in a recordable-type computer readable storage medium in an image processing system, for distinguishing between foreground content and background content in an image presentation, the computer-implemented method comprising:

providing an initial background model on a data processing system that is independent of any particular image presentation;

identifying presentation pages of a set of presentation pages of the image presentation, wherein the foreground content of each identified presentation page of the set of presentation pages are distinct and the background content of each identified presentation page of the set of presentation pages are the same, and wherein the presentation pages are part of a media stream provided to an image processor, wherein the media stream comprises a plurality of image presentation types;

clustering a plurality of content portions from the identified presentation pages into a plurality of distinct presentation content sets, wherein each presentation content set contains content portions that have a same image presentation type;

locating potential background pixels by comparing a first presentation page to a second presentation page, wherein the first presentation page and the second presentation page are located in a same set in the plurality of distinct presentation content sets;

updating the initial background model by incorporating the located potential background pixels into the initial background model to form an updated initial background model;

determining whether the updated initial background model and the initial background model are the same;

responsive to determining that the updated initial background model and the initial background model are the same:

outputting the updated initial background model;

distinguishing between the foreground content and the background content in each image presentation page of the plurality of presentation pages using the updated initial background model; and repeating the steps of comparing the clustered content portions through the step of distinguishing between the foreground content and the background content for each remaining set of the distinct presentation content sets.

2. The computer-implemented method according to claim 1, and further comprising:

responsive to determining that the updated initial background model and the initial background model are not the same:

identifying further presentation pages of the set of presentation pages whose foreground content are distinct and whose background content are the same;

comparing the identified further presentation pages to locate further potential background pixels;

further updating the updated initial background model by incorporating the further located potential background pixels into the updated initial background model to form a further updated initial background model;

outputting the further updated initial background model; and distinguishing between the foreground content and the background content in each presentation page of the plurality of presentation pages using the further updated initial background model.

3. The computer-implemented method according to claim 2, and further comprising:

repeating the steps of identifying further presentation pages, comparing the identified further presentation pages and further updating the updated initial background model until an updated background model reaches a steady state.

4. The computer-implemented method according to claim 1, wherein the image presentation comprises a computer-generated image presentation.

5. The computer-implemented method according to claim 4, wherein the computer-generated image presentation comprises one of a digital slide presentation, a Web page presentation and a video presentation.

6. An image processing system for distinguishing between foreground content and background content in an image presentation, comprising:

a storage medium storing a set of instructions; and a processor, wherein the processor executes the set of instructions to provide an initial background model on a data processing system that is independent of any particular image presentation; to identify presentation pages of a set of presentation pages of the image presentation, wherein the foreground content of each identified presentation page of the set of presentation pages are distinct and the background content of each identified presentation page of the set of presentation pages are the same, and wherein presentation pages are part of a media stream provided to an image processor, wherein the media stream comprises a plurality of image presentation types; to cluster content portions from the identified presentation pages into a plurality of distinct presentation content sets, wherein each presentation content set contains content portions that have a same image presentation type; to locate potential background pixels by comparing a first presentation page to a second presentation page, wherein the first presentation page and the second presentation page are located in a same set in the plurality of distinct presentation content sets; to update the initial background model by incorporating the located potential background pixels into the initial background model to form an updated initial background model; to determine whether the updated initial background model and the initial background model are the same; to, responsive to determining that the updated initial background model and the initial background model are the same, output the updated initial background model, and distinguish between the foreground content and the background content in each image presentation page of the plurality of presentation pages using the updated initial background model; and to repeat the steps of comparing the clustered content portions through the step of distinguishing between the foreground content and the background content for each remaining set of the distinct presentation content sets.

7. The system according to claim 6, wherein the image presentation comprises a computer-generated image presentation.

8. The system according to claim 7, wherein the computer-generated image presentation comprises one of a digital slide presentation, a Web page presentation and a video presentation.

9. The system according to claim 6, wherein the processor further executes the set of instructions to, responsive to determining that the updated initial background model and the initial background model are not the same, identify further presentation pages of the set of presentation pages whose foreground content are distinct and whose background content are the same; compare the identified further presentation pages to locate further potential background pixels; further update the updated initial background model by incorporating the further located potential background pixels into the updated initial background model to form a further updated initial background model; output the further updated initial background model; and distinguish between the foreground content and the background content in each image presentation page of the plurality of presentation pages using the further updated initial background model.

10. The system according to claim 9, wherein the processor further executes the set of instructions to repeat the identifying further presentation pages, the comparing the identified further presentation pages and the further updating the updated initial background model until an updated background model reaches a steady state.

11. A non-transitory computer readable medium storing computer program comprising:
  computer usable program code for providing an initial background model on a data processing system that is independent of any particular image presentation;
  computer usable program code for identifying presentation pages of a set of presentation pages of the image presentation, wherein the foreground content of each identified presentation page of the set of presentation pages are distinct and the background content of each identified presentation page of the set of presentation pages are the same, and wherein the presentation pages are part of a media stream provided to an image processor, wherein the media stream comprises a plurality of image presentation types;
  computer usable program code for clustering content portions from the identified presentation pages into a plurality of distinct presentation content sets, wherein each presentation content set contains content portions that have a same image presentation type;
  computer usable program code locating potential background pixels by comparing a first presentation page to a second presentation page, wherein the first presentation page and the second presentation page are located in a same set in the plurality of distinct presentation content sets;
  computer usable program code for updating the initial background model by incorporating the located potential background pixels into the initial background model to form an updated initial background model;
  computer usable program code for determining whether the updated initial background model and the initial background model are the same;
  responsive to determining that the updated initial background model and the initial background model are the same:
  computer usable program code for outputting the updated initial background model;
  computer usable program code for distinguishing between the foreground content and the background content in each image presentation page of the plurality of presentation pages using the updated initial background model; and
  computer usable program code for repeating the steps of comparing the clustered content portions through the step of distinguishing between the foreground content and the background content for each remaining set of the distinct presentation content sets.

12. The non-transitory computer readable medium according to claim 11, and further comprising:
  responsive to determining that the updated initial background model and the initial background model are not the same:
  computer usable program code for identifying further presentation pages of the set of presentation pages whose foreground content are distinct and whose background content are the same;
  computer usable program code for comparing the identified further presentation pages to locate further potential background pixels;
  computer usable program code for further updating the updated initial background model by incorporating the further located potential background pixels into the updated initial background model to form a further updated initial background model;
  computer usable program code for outputting the further updated initial background model; and
  computer usable program code for distinguishing between the foreground content and the background content in each presentation page of the plurality of presentation pages using the further updated initial background model.

13. The non-transitory computer readable medium according to claim 12, and further comprising:
  computer usable program code for repeating the steps of identifying further presentation pages, comparing the identified further presentation pages and further updating the updated initial background model until an updated background model reaches a steady state.

* * * * *